Nov. 3, 1925.
P. A. H. MOSSAY
1,560,393
CHARGING APPARATUS FOR USE WITH ANNEALING OVENS
Filed Nov. 13, 1924    2 Sheets-Sheet 1
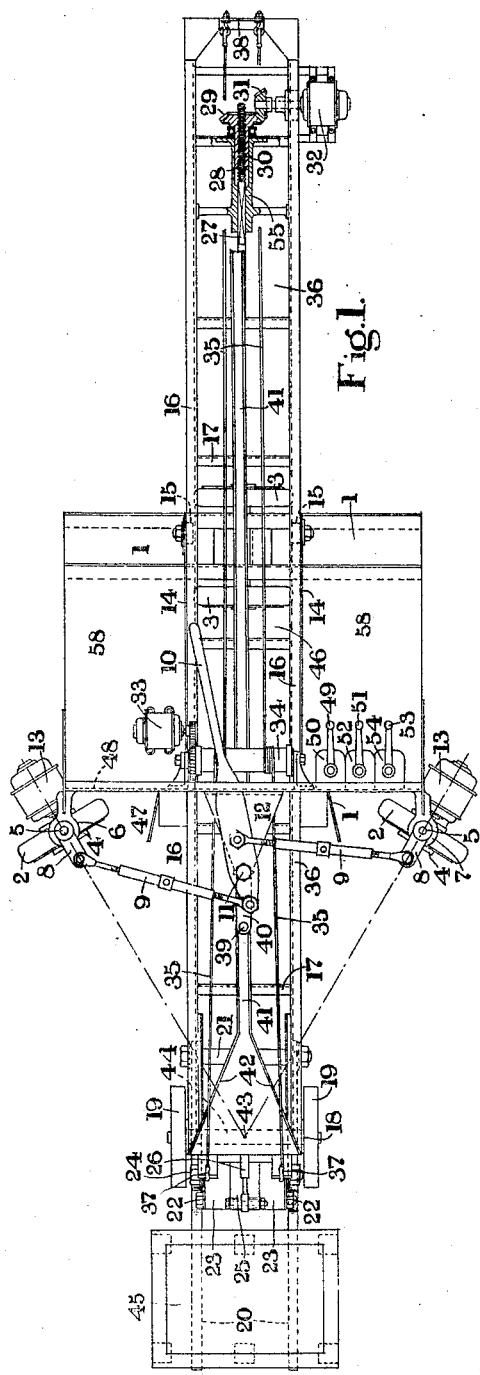
Inventor
P.A.H. Mossay

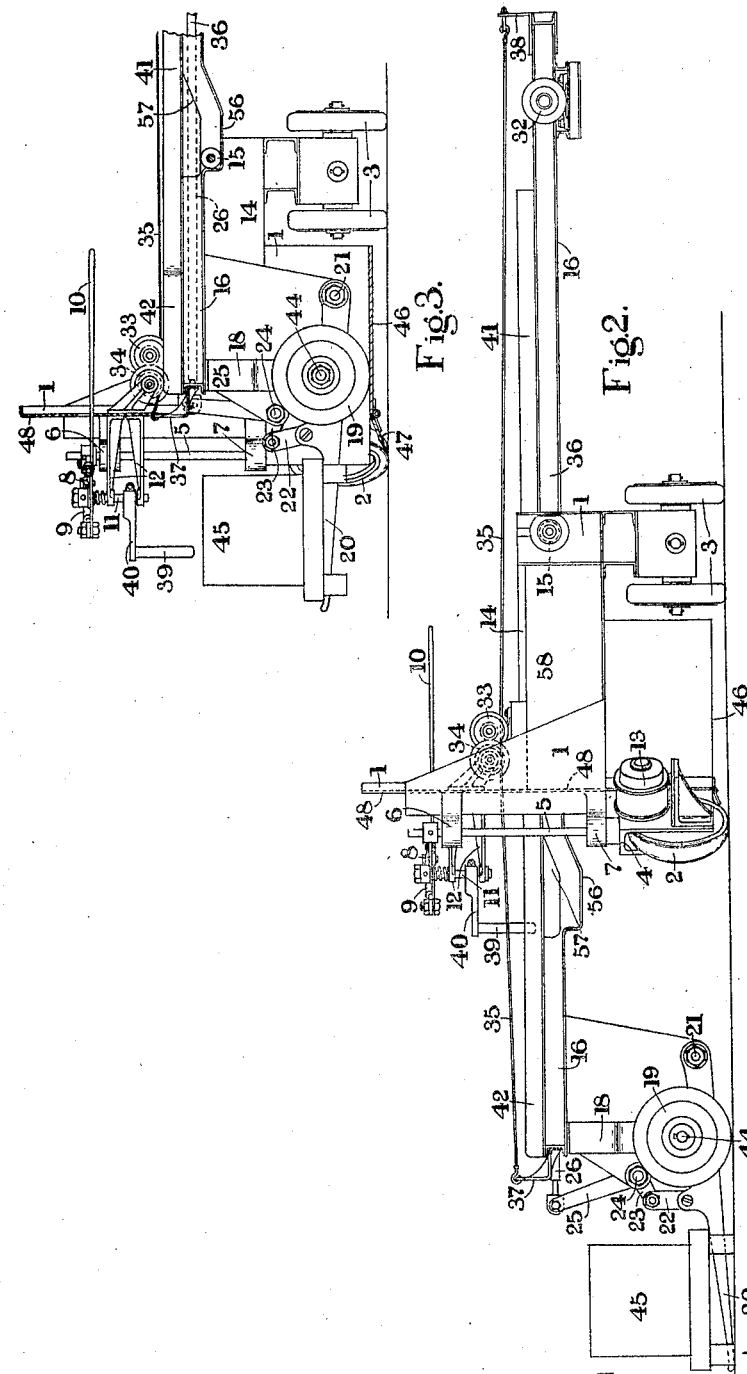

Patented Nov. 3, 1925.

1,560,393

UNITED STATES PATENT OFFICE.

PAUL ALPHONSE HUBERT MOSSAY, OF IPSWICH, ENGLAND.

CHARGING APPARATUS FOR USE WITH ANNEALING OVENS.

Application filed November 13, 1924. Serial No. 749,756.

*To all whom it may concern:*

Be it known that I, PAUL ALPHONSE HUBERT MOSSAY, a subject of the King of Great Britain, residing at Ipswich, in the county of Suffolk, England, have invented certain new and useful Improvements in Charging Apparatus for Use with Annealing Ovens, of which the following is a specification.

This invention relates to apparatus used in the charging of annealing ovens, enamel stoving ovens, furnaces and the like with pots, ingots, or other articles. While the invention is capable of wide application it is particularly suitable for use in the charging of annealing ovens with sheets for the manufacture of tin-plate.

In order that a comparatively light and simple apparatus may be used and also to avoid the use of rail tracks or other structural fixtures adjacent to the oven, so that the apparatus may be manœuvred to pick up, carry and deposit its load, a loading arm, according to the invention, is supported by a carriage which is provided with ground wheels adapted to permit of the carriage being manœuvred thereon.

In order that the arm, when extended, may be manœuvred as required to place the pot or other article in any desired position, and, moreover, to enable the manœuvring to be effected without setting up undue side stresses on the arm, means may be provided to ensure that the wheels of the carriage are set in positions wherein their axes are radial to a centre of oscillation at the front end of the arm when the arm is extended; for instance, assuming that the front end of the arm is fitted with two wheels, the centre of oscillation is the centre of the axle of the two wheels. The driving wheels of the carriage may be non-swivelling wheels arranged on a centre line which is radial to the centre of oscillation, or the steering wheels may be the driving wheels. The steering wheels of the carriage may be controlled automatically, so that when the arm is extended more or less they are definitely set in position with their axes radial to the said centre of oscillation, but when the arm is withdrawn the steering wheels are freed.

The carriage may be self-propelled. It may be provided with means by which the arm when retracted and with or without its load may be wholly supported clear of the ground. In such a case the automatic steering mechanism may free the steering wheels so that they may be adjusted either by hand or power to enable the apparatus to be run in any desired direction.

In the accompanying drawings:—

Figure 1 is a plan partly in section, and

Figure 2 is a side elevation of one form of apparatus according to the invention.

Figure 3 is a sectional side elevation of the carriage with the fore part of the charging arm drawn up thereon, the section being taken through the carriage.

In one form of apparatus suitable for example, for charging annealing ovens with pots of tin-plate, a steel framework or carriage 1, is mounted on two swivelling front steering wheels 2, 2, and non-swivelling rear-wheels 3, the axis of the rear wheels being preferably arranged centrally between the axes of the front steering wheels. The steering wheels 2 are mounted in forked bearings 4 carried by vertical steering columns 5 rotatable in bearings 6, 7, on the carriage 1. Each column 5 has a crank 8 connected by an adjustable rod or turnbuckle 9 to a hand lever 10 having a pivot pin 11 carried by brackets 12 on the carriage 1. Under certain conditions the operator by means of the hand lever 10 moves both wheels 2, 2, simultaneously from a position in which they are parallel or follow in the track of each other into other positions suitable for the manœuvring of the carriage. The steering wheels 2 are adapted to be driven, for instance, by electric motors 13 so controlled that the wheels may be rotated in either of two directions as desired to effect the manœuvring of the carriage. The rear wheels 3 may be driven instead of or in addition to the steering wheels 2.

The carriage 1 has a central guide way comprising side plates 14 fitted with rollers 15 for engagement with a charging arm 36 which comprises longitudinal channel irons 16 and cross irons 17 or may be of a lattice steel construction. The charging arm has brackets 18 at its front end provided with a pair of wheels 19 and also a pair of levers 20, as usual, or other means for raising, lowering and carrying the pot to be charged in or removed from the oven.

In the example shown the levers 20 are pivoted at 21 and are connected by links 22 to levers 23 fixed on a rock shaft 24, on which is also fixed a lever 25, to which a rod 26 is connected. The rod 26 passes to the rear of the charging arm. It has a square part 27 which passes through a corresponding hole in a fixed guide sleeve 55. It is also screw threaded at 28 where it engages within a screw threaded hole in a bevel wheel 29 having a sleeve 30 freely rotatable in the guide sleeve 55. A bevel wheel 31 on the shaft of a motor 32 meshes with the wheel 29 and accordingly as the motor is rotated in one direction or the other the rod 26 raises or lowers the levers 20.

The charging arm 36 is conveniently extended and retracted by a motor 33 on the carriage 1, driving a winch 34 having one or more cables 35 connected to brackets 37 and 38 on the two ends of the charging arm 36. Toothed gears, racks, hydraulic, air or steam operated devices, may be used intsead. In order that the steering wheels 2, 2, may be set automatically in positions permitting of a lateral movement of the carriage 1 while the charging arm 36 is extended, without undue side stress on the arm, a pin 39 or roller carried by a lever 40 fixed on the pivot pin 11 of the steering gear engages within a channelled guide bar 41 on the charging arm so arranged that, so long as the charging arm 36 is extended, the steering gear cannot be operated by hand, but is governed by the relative position of the fore end or pot carrier of the charging arm, the channelled guide bar or cam slot 41 being inclined or so shaped that when the charging arm is extended or retracted it moves the pin 39 and thence the lever 40 and so operates the steering gear as to move the wheels 2 and maintain them with their axes radial to the centre point of the axis of the wheels 19 of the pot carrier. When the charging arm 36 is fully retracted the widened end 42 of the guide 41 releases the pin 39 and the steering gear is free and the carriage can be moved into any desired position. When the charging arm is being extended the widened end 42 of the cam 41 guides the pin 39 into the guide 41.

When the steering mechanism is controlled by the guide 41 the steering wheels 2 have their axes approximately radial to the centre 43 of the forward axle 44 of the wheels 19 of the charging arm 36 so that the carriage 1 may be moved about said point 43 as a centre of oscillation. Thus, the charging arm 36 can be manœuvred in any direction as required to place the pot 45 in a given position, but without throwing undue lateral stresses on the arm.

The carriage 1 is provided with a platform 46 for supporting the wheels 19 of the charging arm 36 when the latter is fully retracted as shown in Figure 3, a hinged and spring controlled ramp 47 being provided at the front edge of the platform 46 to facilitate the passage of the wheels 19 from the floor to the said platform, and similarly to pass back again to the floor when the charging arm is extended.

In order that the fore end of the charging arm may rise up on the platform 46 of the carriage 1, the channel irons 16 of the arm are provided with depressions 56 and with cams 57 which engage with the rollers 15.

By arranging the wheels 2, 2, 3, 3, of the carriage 1 as above described the loaded fore-end of the charging arm 36 may be raised into the carriage 1, practically within the wheel base thereof, and a comparatively light and economical structure for the carriage 1 is possible in spite of the heavy load of the pot.

Electric accumulator boxes 58 may be mounted on the carriage 1 or means may be provided for connecting the motors to a flexible cable.

The whole of the front of the carriage 1 except a central opening for the passage of the charging arm, is preferably protected by a screen 48 which may be fitted with an obscured or tinted glass sight hole for the operator seated on the carriage 1 behind it, with the steering lever 10 and electric motor control lever or levers in easy reach. Four levers are preferable, one 10 for steering, one 49 for operating the controller 50 of the propelling motors 13, one 51 for operating the controller 52 of the motor 33 which extends and retracts the charging arm, and one 53 for operating the controller 54 of the motor 32 for operating the levers 20 for lifting and releasing the pot at the front end of the charging arm. A single controller may be used to control all the electrical appliances.

The wheels of the carriage when adequately screened may be fitted with rubber tyres, but the wheels on the arm are of a steel or other material capable of withstanding the heat in the oven.

Although the arm may be at such a level as to clear pots or like obstructions standing near the oven or furnace, it may be made in sections hinged together so that one or more sections may be raised or folded over when the arm has been retracted and the apparatus has to run off along a narrow gangway.

In a simple form the carriage may be merely provided with two wheels which act both as steering and driving wheels and are arranged so that when the arm is retracted but not raised clear of the ground they are parallel to the wheels on the charging arm and permit of the apparatus being moved through a narrow door or gangway.

When the arm is extended the wheels are set automatically into positions with their axes radial to the centre of oscillation and enable the carriage to be manœuvred about said centre.

Any form of motor may be used for example an internal combustion motor, in which case suitable change gears and clutches are provided to enable it to be put into driving connection with the road wheels, the winch for the arm and means for raising and lowering the pot. Hydraulic, compressed air, steam or petrol-electric systems may be adopted on the apparatus or a stationary plant may supply power through a flexible driving connection.

I claim:—

1. A railless apparatus for charging annealing ovens and for like purposes, comprising a carriage provided with ground wheels, a charging arm supported by said carriage and adapted to reciprocate relatively thereto, a charge carrier connected to one end of said loading arm, said charge carrier being adapted to rest on the ground, and means for automatically maintaining the ground wheels of said carriage with their axes radial to the centre of oscillation of said charge carrier when the charging arm is extended relatively to said carriage, substantially as and for the purpose hereinbefore set forth.

2. A railless apparatus for charging annealing ovens and for like purposes, comprising a carriage provided with ground wheels including swivelled steering wheels, a charging arm supported by and adapted to reciprocate relatively to said carriage, a charge carrier at one end of said charging arm and adapted to rest on the ground, and means for automatically moving said steering wheels so as to maintain their axes radial to the centre of oscillation of said charge carrier as the charging arm is extended, substantially as and for the purpose hereinbefore set forth.

3. A railless apparatus for charging annealing ovens and for like purposes, comprising a carriage provided with ground wheels, power operated means for driving some of said wheels, means for adjusting some of said wheels for steering purposes, a charging arm supported by and adapted to reciprocate relatively to said carriage, a charge carrier on one end of said arm, said charge carrier having ground wheels and means operable simultaneously with the reciprocatory movements of said charging arm for adjusting said steering wheels to maintain them with their axes radial to the centre of oscillation of said charge carrier in any extended position of said charging arm, substantially as and for the purpose hereinbefore set forth.

4. A railless apparatus for charging annealing ovens and for like purposes, comprising a carriage having ground wheels including steering wheels, a charging arm supported by said carriage, a charge carrier connected to one end of said arm and provided with ground wheels, means for extending and retracting said charging arm relatively to said carriage, means for raising said charge carrier on to said carriage in the extreme retracted position of said charging arm, manually controlled means for adjusting said steering wheels when said charge carrier is on said carriage, and means for automatically adjusting said steering wheels when said charging arm is extended to remove said carrier from said carriage, so as to maintain the axes of said steering wheels radial to the centre of oscillation of said charge carrier, substantially as and for the purpose hereinbefore set forth.

5. A railless apparatus for charging annealing ovens and for like purposes, comprising a carriage having ground wheels including steering wheels, a charging arm supported by said carriage, means for reciprocating said arm relatively to said carriage, a charge carrier connected to one end of said arm, a cam on said charging arm and steering mechanism operable by said cam, when said charging arm is reciprocated relatively to said carriage, substantially as and for the purpose hereinbefore set forth.

6. A railless apparatus for charging annealing ovens and for like purposes, comprising a carriage having ground wheels including steering wheels, a charging arm supported by said carriage, means for reciprocating said arm relatively to said carriage, a charge carrier connected to one end of said arm, a cam on said charging arm and steering mechanism operable by said cam, when said charging arm is reciprocated relatively to said carriage, said cam being adapted to release said steering mechanism when said charging arm is wholly retracted, substantially as and for the purpose hereinbefore set forth.

7. A railless apparatus for charging annealing ovens and for like purposes, comprising an automobile carriage having ground wheels, a charging arm supported by and adapted to be reciprocated relatively to said carriage, a charge carrier connected to one end of said arm, means for manœuvering said carriage on its ground wheels about a centre of oscillation situated coincident with said charge carrier, while said charging arm is extended, and means for manœuvring said carriage in any desired direction when said charging arm is in its extreme retracted position.

8. A railless apparatus for charging annealing ovens and for like purposes, comprising a carriage having ground wheels adapted to be adjusted to permit oscillations of said carriage about a variable centre of oscillation situated outside the wheel base of said carriage, a charging arm supported by and adapted to be extended and retracted relatively to said carriage, a charge carrier having ground wheels and connected to one end of said charging arm, and means for adjusting the ground wheels of said carriage so as to maintain the aforesaid centre of oscillation within the wheel base of the charge carrier while the charging arm is extended relatively to the carriage, substantially as and for the purpose hereinbefore set forth.

9. A railless apparatus for charging annealing ovens and for like purposes, comprising a carriage having ground wheels adapted to be adjusted to permit oscillations of said carriage about a variable centre of oscillation situated outside the wheel base of said carriage, a charging arm supported by and adapted to be extended and retracted relatively to said carriage, a charge carrier having ground wheels and connected to one end of said charging arm, means for adjusting the ground wheels of said carriage so as to maintain the aforesaid centre of oscillation within the wheel base of the charge carrier while the charging arm is extended relatively to the carriage, and means for adjusting said ground wheels of said carriage when said charging arm is in its extreme retracted position to permit manœuvring of said carriage on said ground wheels in any desired direction, substantially as and for the purpose hereinbefore set forth.

10. An electrically operated railless automobile apparatus for charging annealing ovens and for like purposes, comprising a carriage, a charging arm supported by and adapted to be extended and retracted relatively to said carriage, a charge carrier connected to one end of said charging arm, said carriage being adapted to make oscillatory movements about said charge carrier when said charging arm is extended and to make universal travelling movements when said charging arm is in its extreme retracted position, substantially as and for the purpose hereinbefore set forth.

In testimony whereof I have signed my name to this specification.

PAUL ALPHONSE HUBERT MOSSAY.